United States Patent
Imasato et al.

(10) Patent No.: US 12,094,628 B2
(45) Date of Patent: Sep. 17, 2024

(54) COVERED ELECTRIC WIRE AND WIRE HARNESS

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Fumitoshi Imasato, Yokkaichi (JP); Toyoki Furukawa, Yokkaichi (JP); Kyoma Sahashi, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 114 days.

(21) Appl. No.: 17/913,374

(22) PCT Filed: Mar. 30, 2021

(86) PCT No.: PCT/JP2021/013521
§ 371 (c)(1),
(2) Date: Sep. 21, 2022

(87) PCT Pub. No.: WO2021/200937
PCT Pub. Date: Oct. 7, 2021

(65) Prior Publication Data
US 2023/0154649 A1    May 18, 2023

(30) Foreign Application Priority Data
Mar. 30, 2020    (JP) .................................. 2020-060544

(51) Int. Cl.
*H01B 7/02* (2006.01)
*H01B 7/08* (2006.01)
(Continued)

(52) U.S. Cl.
CPC ............... *H01B 7/295* (2013.01); *H01B 7/02* (2013.01); *H01B 7/08* (2013.01); *B60R 16/0207* (2013.01)

(58) Field of Classification Search
CPC ... H01B 3/04; H01B 3/30; H01B 3/42; H01B 3/427; H01B 7/02; H01B 7/0225;
(Continued)

(56) References Cited

U.S. PATENT DOCUMENTS

2011/0079427 A1*    4/2011   Powale ................. H01B 3/427
                                                    174/72 A
2013/0240244 A1*    9/2013   Honda .................. H01B 3/306
                                                    174/119 C
(Continued)

FOREIGN PATENT DOCUMENTS

JP    2002-231070 A    8/2002
JP    2014-130739 A    7/2014
(Continued)

OTHER PUBLICATIONS

Jun. 20, 2023 Office Action issued in Japanese Patent Application No. 2022-512532.
(Continued)

*Primary Examiner* — William H. Mayo, III
(74) *Attorney, Agent, or Firm* — Oliff PLC (57) ABSTRACT

A covered electric wire contains a conductor and an insulation covering which covers an outer surface of the conductor. The covered electric wire has a flat portion where a cross section of the conductor intersecting an axial direction of the covered electric wire has a flat shape which has a
(Continued)

larger length in a width direction. The insulation covering contains, in the cross section of the flat portion, plane regions which contains, at the surface thereof: a width-directional region along the width direction; and a height-directional region intersecting the width direction. The insulation covering contains a region having a rounded shape having a radius at the junction between the width-directional region and the height-directional region, and the covered electric wire satisfies a relationship of R>t between the radius R and a thickness t of the insulation covering at the plane region. The wire harness contains the covered electric wire.

13 Claims, 5 Drawing Sheets

(51) Int. Cl.
*H01B 7/295* (2006.01)
*B60R 16/02* (2006.01)

(58) Field of Classification Search
CPC ... H01B 7/04; H01B 7/06; H01B 7/08; H01B 7/295; H01B 13/0013; H01B 13/14; H01B 13/141
USPC .......................................... 174/110 R–122 R
See application file for complete search history.

(56) References Cited

U.S. PATENT DOCUMENTS

| | | | |
|---|---|---|---|
| 2014/0020929 A1* | 1/2014 | Hisada | H01B 7/0225 174/110 SR |
| 2015/0221412 A1* | 8/2015 | Caudill | H01B 3/427 428/339 |
| 2016/0307668 A1* | 10/2016 | Oya | H01B 13/141 |
| 2017/0294249 A1* | 10/2017 | Oya | H02K 3/30 |
| 2020/0335240 A1 | 10/2020 | Ooi et al. | |
| 2021/0193348 A1 | 6/2021 | Ooi et al. | |

FOREIGN PATENT DOCUMENTS

| | | |
|---|---|---|
| JP | 2018-006174 A | 1/2018 |
| JP | 2018-129195 A | 8/2018 |
| JP | 2019-149242 A | 9/2019 |
| WO | 2016/103804 A1 | 6/2016 |
| WO | 2019/093309 A1 | 5/2019 |
| WO | 2019/093310 A1 | 5/2019 |

OTHER PUBLICATIONS

Jun. 22, 2021 International Search Report issued in International Patent Application No. PCT/JP2021/013521.

* cited by examiner

[5A] Sample 1

R1.6

[5B] Sample 3

R2.5

[5C] Sample 4

R3.5

[5C] Sample 5

COVERED ELECTRIC WIRE AND WIRE HARNESS

TECHNICAL FIELD

The present disclosure relates to a covered electric wire and a wire harness.

BACKGROUND ART

A flat cable containing a flat-shaped conductor is commonly known. A flat cable occupies a smaller space for routing than a conventional electric wire configured with a conductor having a substantially circular cross section.

In a conventional flat cable, as disclosed in Patent Literatures 1 and 2, a flat rectangular conductor is often used as the conductor. The flat rectangular conductor is a single metal wire shaped to have a cross section formed into a square. In addition, Patent Literatures 3 and 4, which were applied by applicants, each discloses an electric wire conductor consisting of a wire strand containing a plurality of elemental wires twisted together and having a flat portion where a cross section of the electric wire strand intersecting an axial direction of the wire strand has a flat shape from a viewpoint of achieving both flexibility and space saving.

CITATION LIST

Patent Literature

Patent Literature 1: JP 2014-130739 A
Patent Literature 2: JP 2019-149242 A
Patent Literature 3: WO 2019/093309 A
Patent Literature 4: WO 2019/093310 A
Patent Literature 5: JP 2018-129195 A
Patent Literature 6: JP 2018-006174 A

SUMMARY OF INVENTION

Problems to be Solved by the Invention

Figure 4:
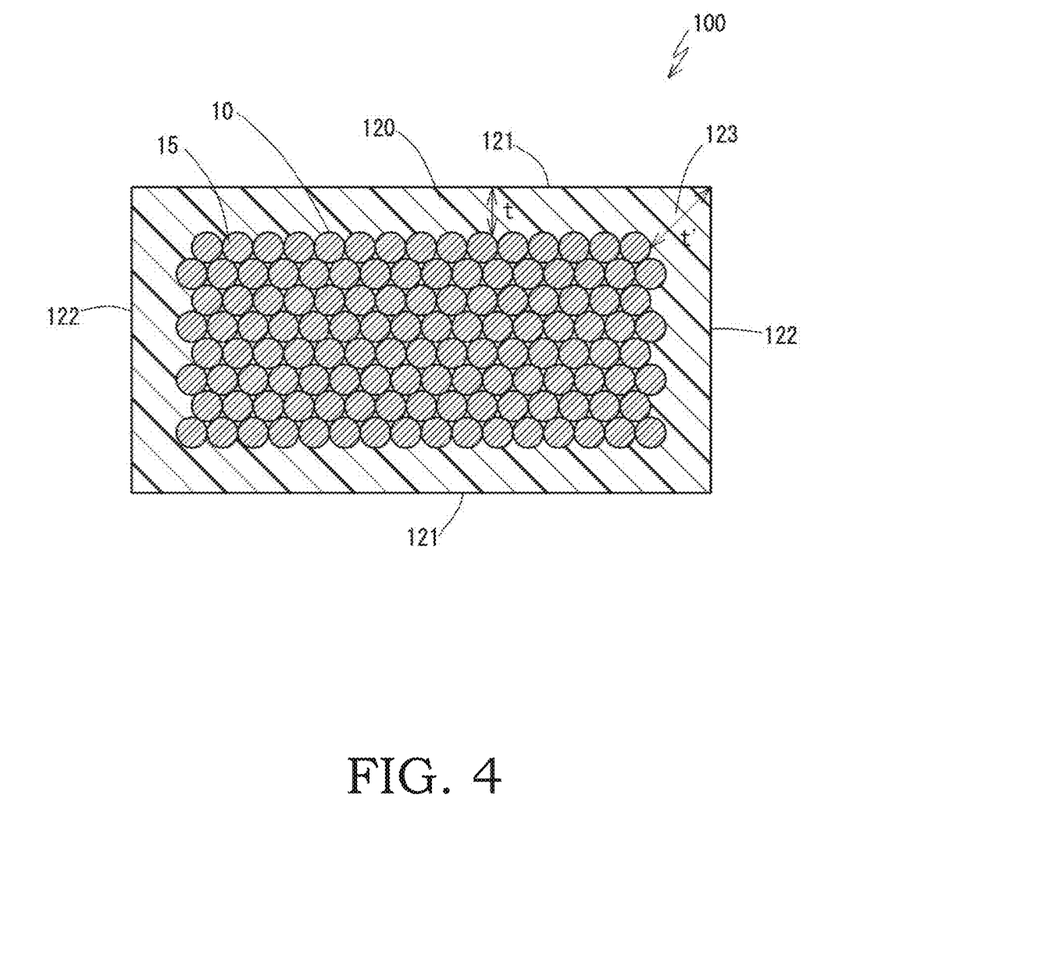
FIG. 4 is a cross-sectional view showing a case where an insulation covering which covers the conductor having a flat shape is not provided with corner roundness.
Figure 5:
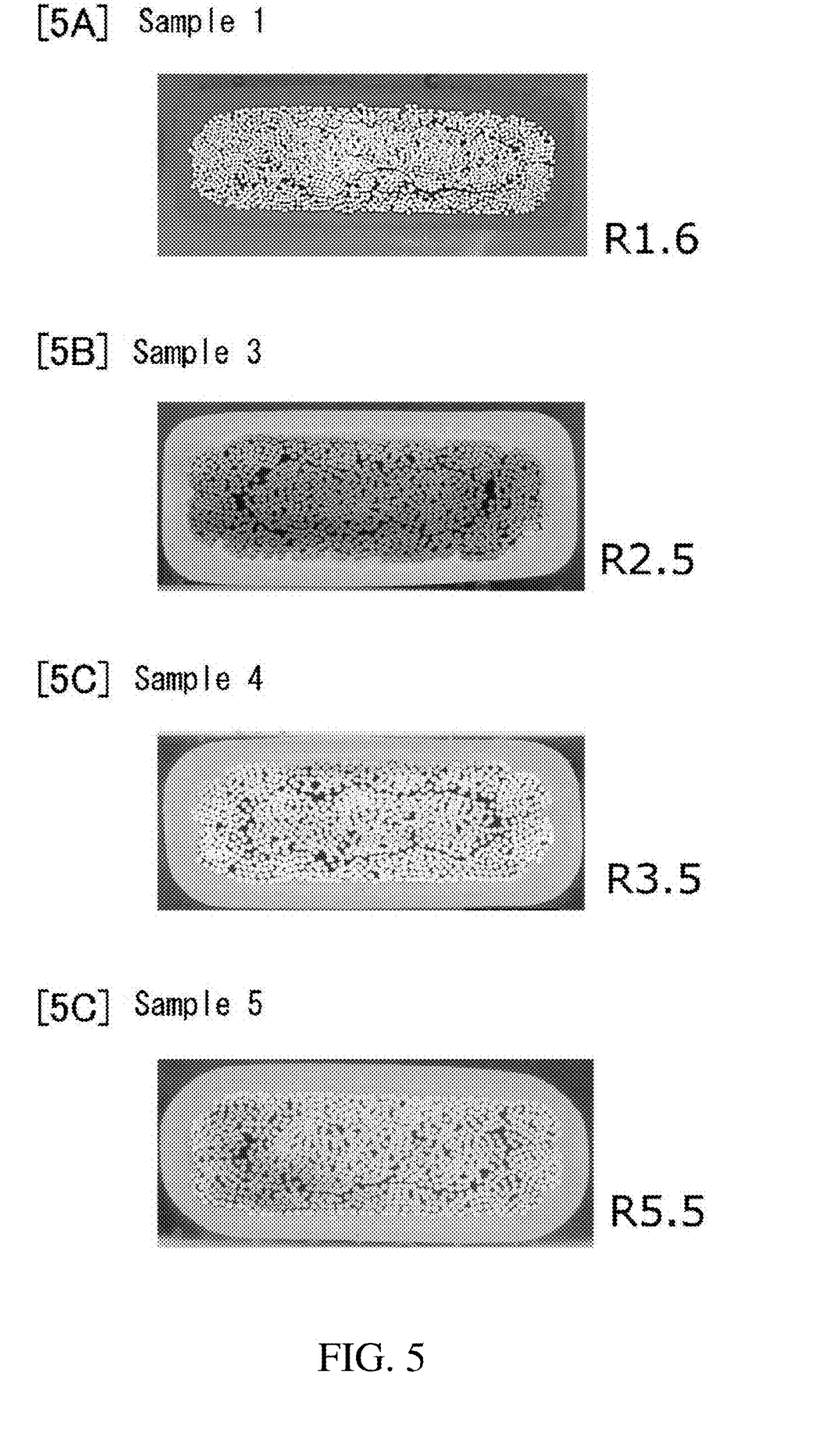
FIGS. 5A-5D are photographs of cross sections of the covered electric wires having mutually different sizes of corner roundness.

When an insulation covering is formed at an outer surface of a conductor having a substantially circular cross section, a layer of the insulation covering with a highly uniformed layer can be formed on the entire surface of the conductor. In contrast, when the conductor has a cross section of a flat shape, it is difficult to form the insulation covering with a uniform thickness on the entire surface of the flat shape. For instance, in the covered electric wire 100 as illustrated in FIG. 4, the insulation covering 120 formed on the outer surface of the flat conductor 10 tends to be thicker in the positions corresponding corners 123 of the flat shape than in the positions corresponding to the plane regions 121, 122 (t'>t). When the insulation covering is thicker in some areas than in other areas, there is a possibility that sufficient flame retardancy may not be achieved in those areas. This is because, in those areas, the volume of the insulation covering which can be burned is larger and the distance from the surface of the insulation covering to the surface of the conductor is larger. As a result, it would be difficult to dissipate heat from the insulation covering to the conductor sufficiently in those areas. Especially, when the covered electric wires are installed in vehicles such as automobiles, low flame retardancy of the covered electric wire may facilitate spreading of fire through the covered electric wire in the event of a fire.

Thus, an object is to provide a covered electric wire which has excellent flame retardancy, with a structure where an insulation covering is applied on an outer surface of a conductor having a flat-shaped cross section and a wire harness that contains the covered electric wire.

Means of Solving the Problems

The present disclosure relates to a covered electric wire containing a conductor and an insulation covering which covers an outer surface of the conductor. The covered electric wire has a flat portion where a cross section of the conductor intersecting an axial direction of the covered electric wire has a flat shape which has a larger length in a width direction. The insulation covering contains, in the cross section of the flat portion, plane regions which contains, at the surface thereof: a width-directional region along the width direction; and a height-directional region intersecting the width direction. The insulation covering further contains a region having a rounded shape having a radius R at the junction between the width-directional region and the height-directional region, and the covered electric wire satisfies a relationship of R>t between the radius R and a thickness t of the insulation covering at the plane region.

The present disclosure relates also to a wire harness containing the covered electric wire.

Advantageous Effects of the Invention

The covered electric wire according to the present disclosure shows excellent flame retardancy, with a structure where an insulation covering is applied on an outer surface of a conductor having a flat-shaped cross section. The wire harness according to the present disclosure contains such covered electric wire.

DESCRIPTION OF EMBODIMENTS

Description of Embodiments of the Present Disclosure

Firstly, embodiments of the present disclosure are described.

A covered electric wire contains a conductor and an insulation covering which covers an outer surface of the conductor. The covered electric wire has a flat portion where a cross section of the conductor intersecting an axial direction of the covered electric wire has a flat shape which has a larger length in a width direction. The insulation covering contains, in the cross section of the flat portion, plane regions which contains, at the surface thereof: a width-directional region along the width direction; and a height-directional region intersecting the width direction. The insulation covering further contains a region having a rounded shape having a radius R at the junction between the width-directional region and the height-directional region, and the covered electric wire satisfies a relationship of R>t between the radius R and a thickness t of the insulation covering at the plane region.

In the above-described covered electric wire, the insulation covering which covers the outer surface of the conductor having a flat-shaped cross section contains the region having a rounded shape at the corner formed as a junction between the width-directional region and the height-directional region as the plane region. Moreover, since the radius R of the rounded shape satisfies the relationship of R>t with respect to the thickness t of the insulation covering at the plane region, and the corners have gently curved shapes. Thus, the thickness of the insulation covering is not excessively thicker at the corners than in the width-directional region and the height-directional region. As a result, in the corners, volume of the insulation covering is suppressed small, and the distance from the surface of the insulation covering to the conductor can be smaller. Thus, when contact of flame or combustion occurs at the insulation covering, in all regions including the corner, heat of the insulation covering can be efficiently dispersed to the conductor so that the temperature of the insulation covering can be decreased. In other words, the region having the rounded shape formed at the corner suppresses combustion of the insulation covering and increase flame retardancy of the covered electric wire.

Here, the insulation covering preferably contains a polyolefin and a flame retardant containing a metal compound. In this case, the resin component composing the insulation covering does not itself have excellent flame retardancy like a chlorine-containing polymer; so, there would be a possibility that the insulation covering cannot obtain sufficient flame retardancy at the corner without providing the rounded shape formed at the corner of the insulation covering. However, as described above, the formation of rounded shape satisfying the relationship of R>t leads to excellent flame retardancy even at the corner.

The covered electric wire preferably satisfies a relationship of $t>0.10\sqrt{s}$ between the conductor cross-sectional area s and a thickness t of the insulation covering at the plane region. In this case, the thickness of the insulation covering will be relatively thick with respect to the cross-sectional area of the conductor. However, since the rounded shape with R>t is formed at the corners so that the insulation covering will not be excessively thick at the corners, the corners of the insulation covering are helped to have sufficient flame retardancy.

The covered electric wire preferably satisfies a relationship of $t'>0.8t$ between a thickness t' of the insulation covering in the region having the rounded shape and a thickness t of the insulation covering at the plane region. Then, the thickness t' of the insulation covering at the corner will not be excessively smaller compared to the thickness t of the insulation covering at the plane region, so that the influence caused by an excessively thin insulation covering such as reduced insulation and abrasion resistance can be suppressed.

The covered electric wire preferably has a flatness ratio of four or smaller, where the flatness ratio is estimated as w/h, defining the length of the conductor along the width direction as w and the length of the conductor along the height direction as h. Then, since the conductor will not have an excessively flat shape, it is possible to suppress decrease in flame retardancy of the entire covered electric wire, which may occur when the conductor has a higher flatness and concomitantly the insulation covering has a larger volume.

The conductor preferably contains a wire strand containing a plurality of elemental wires twisted together. Then, the conductor is more likely to be both flexible and space saving. In addition, use of a wire strand helps formation of a conductor having a flat portion even if the conductor cross-sectional area is large. When a conductor cross-sectional area is larger, a thicker insulation covering tends to be formed, and thus the effect of improving flame retardancy by forming the rounded shapes at the corners is enlarged relatively.

The wire harness according to the present disclosure contains the covered electric wire according to the present disclosure. As described above, the covered electric wire according to the present disclosure has a rounded shape at the corners of the insulation covering in the flat portion, and the radius R at the rounded shape is sufficiently large, satisfying the relationship of R>t with respect to the thickness t of the insulation covering at the plane region. Thus, the covered electric wire shows excellent flame retardancy. Its excellent flame retardancy can also be exploited in the wire harness.

Detailed Description of Embodiments of the Present Disclosure

Hereinafter, detailed description of a covered electric wire and a wire harness according to one embodiment of the present disclosure will be provided with figures. In the present description, concerning the shapes of parts of the insulation covering, concepts for describing the shape or arrangement of parts such as straight line, circular arc, flat, parallel, and vertical may include deviations with reference to the concepts in geometry within the allowable range for this type of covered electric wires such as deviations in a length of approximately ±15%, and in an angle of approximately ±15°. In the present specification, the cross section of a covered electric wire or a conductor shall refer to the cross-sectional cut intersecting to an axial direction (i.e., a longitudinal direction).

<Outline of the Covered Electric Wire>

Figure 1:
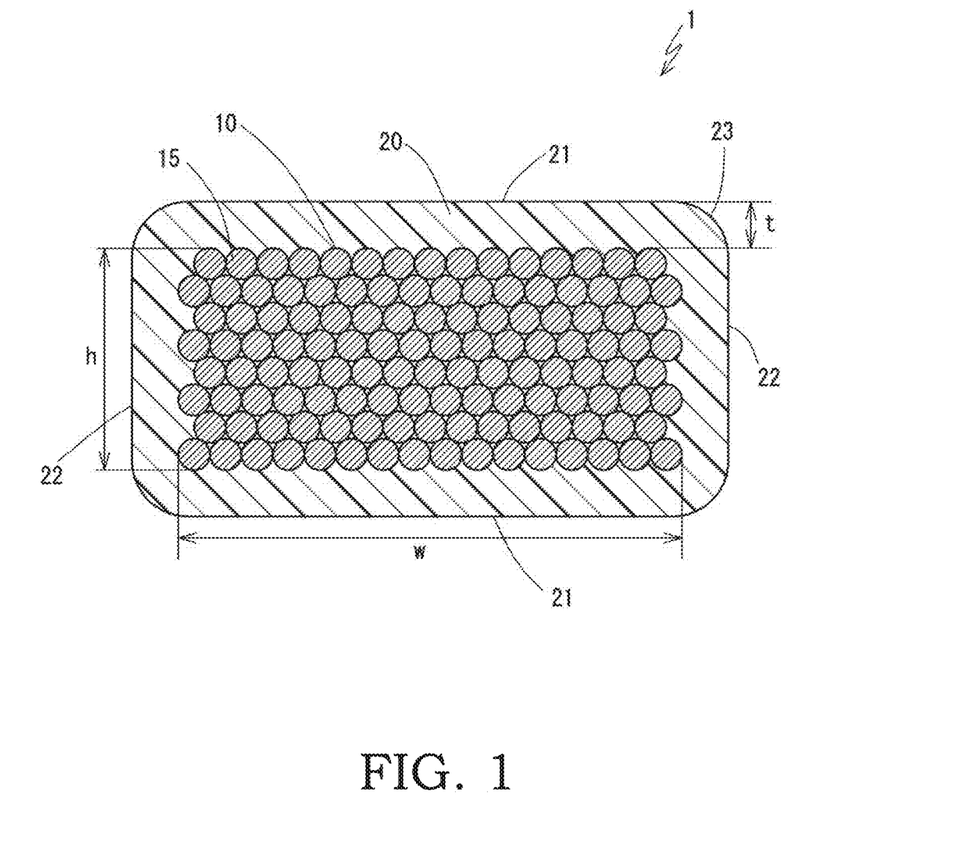
FIG. 1 is a cross-sectional view of a covered electric wire according to one embodiment of the present disclosure.
Figure 2:
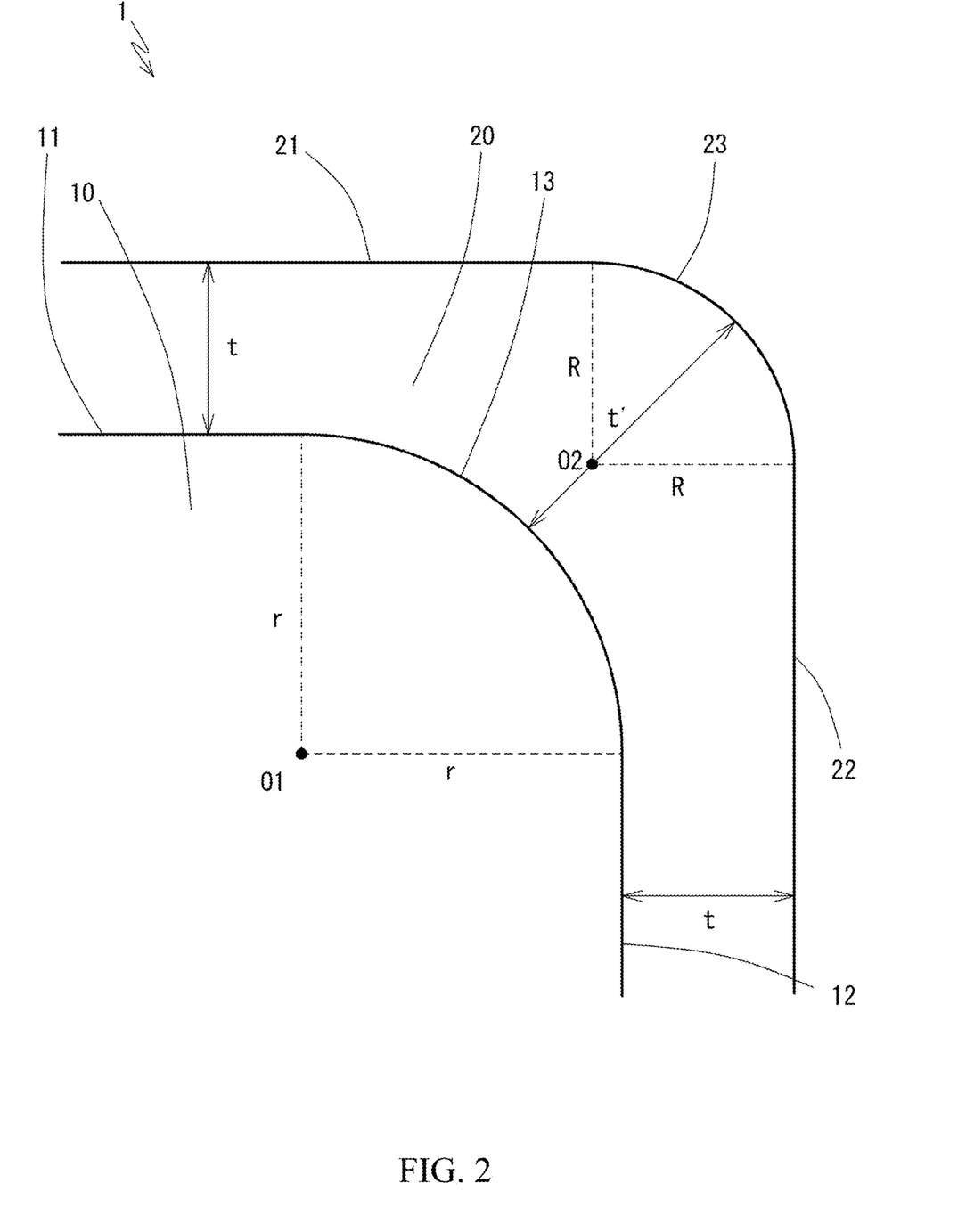
FIG. 2 is an enlarged view of a vicinity of the corner of the covered electric wire according to one embodiment of the present disclosure, showing a case where a radius R of a rounded corner shape of an insulation covering is relatively small. A conductor is indicated by a circumscribing figure.

FIG. 1 shows a cross-sectional view of a covered electric wire 1 according to one embodiment of the present disclosure. In addition, FIG. 2 shows an enlarged view of a vicinity of the corner of the covered electric wire 1. The covered electric wire 1 according to the present embodiment has a conductor 10 and an insulation covering 20. The insulation covering 20 covers the outer surface of the conductor 10 for entire periphery. In FIG. 2, the conductor 10 is illustrated by a circumscribed figure.

The conductor 10 has a flat shape at least in some area along the axial direction of the covered electric wire 1. In other words, the conductor 10 has a flat portion where its cross section has a flat shape. In the present embodiment, the entire region of the conductor along the axial direction of the conductor 10 constitutes the flat portion.

Here, the concept that "the cross section of the conductor 10 has a flat shape" indicates a state where a width w, which is a length of the largest line among lines that extend in the cross section in parallel to edges constituting the cross section and encompass the entire cross section, is larger than a height h, which is a length of a line perpendicular to the above-mentioned longest line and encompass the entire cross section. While the cross-sectional shape of the conductor 10 may have any specific shape as long as it is flat, it is preferable in the present embodiment that the cross section of the conductor 10 has a cross-sectional shape that can be approximated as a rectangle except that the cross section has the rounded shape at the four corners 13. This is because such a cross-sectional shape helps the covered electric wire 1 to improve the space saving property and to form the insulation covering 20 having a uniform thickness in the plane regions 21, 22, which will be explained later. Here, the concept that "the cross-sectional shape of the conductor 10 is rectangular" indicates a state that the circumscribed figure of the conductor 10 can be approximated as a rectangle within an error range of approximately ±15° in terms of a mutual relationship between the edges.

As described later, in the present covered electric wire 1, the insulation covering 20 is provided regions having a round shape at the corners 23 from a viewpoint of obtaining the effect of decreasing the thickness of the insulation covering 20 at the corners 23. From a viewpoint of increasing the effect, it is preferable that the conductor 10 also has a rounded shape (i.e., a round-chamfered shape; or a rounded corner shape) at the corners 13, or in other words, at the junctions between the width-directional edges 11 and the height-directional edges 12. It is preferable that a radius r of the rounded corner shape of the conductor 10 is 33% to 66% of the length of the height-directional side (short side) of the conductor 10. Further, the radius r of the rounded corner shape at the corner 13 of the conductor 10 may be evaluated based on the circumscribed figure of the conductor 10 as illustrated in FIG. 2; however, it is not necessarily clear whether the circumscribed figure has the rounded corner shape since FIG. 1 contains reduced number of elemental wires 15 constituting the conductor 10 for clarity of understanding easily. When the number of the elemental wires 15 constituting the conductor 10 is even larger (for example, when the number of the elemental wires 15 is 150 or larger), the rounded corner shape in the circumscribed figure can be clearly recognized.

The configuration of the conductor 10 is not specifically limited as long as the conductor 10 has the flat portion. For instance, the conductor 10 may have a single-wire structure made of an integrally formed metallic material such as a metal foil or a metal plate. However, in the present embodiment, the conductor 10 consists of a wire strand comprising a plurality of the elemental wires 15 twisted together. When the conductor 10 is constructed as the wire strand, the covered electric wire 1 can have both the space saving property due to the flat shape of the conductor 10 and the flexibility due to the twisted structure. For instance, the wire strand having the flat shape can be prepared by pressing of the raw wire strands containing a plurality of the elemental wires 15 twisted together and having a substantially circular cross section.

In the conductor 10 constructed as the wire strand, at least some of the elemental wires 15 constituting the conductor 10 may be deformed in cross section from the circular shape concomitantly with formation of the conductor 10 into a flat shape. However, from a viewpoint of securing excellent flexibility of the conductor 10, it is preferable that a deformation ratio from the circular shape of the elemental wires 15 is smaller than in the outer circumferential region in the cross section than in the inner region. In addition, in the cross section of the conductor 10, it is preferable to leave a vacant space that can accommodate one or more elemental wires 15, or even two or more elemental wires 15 among the elemental wires 15.

In the covered electric wire 1, the cross-sectional area of the conductor is not specifically limited. However, in general, in a covered electric wire, when the cross-sectional area is larger, a thickness of the insulation covering provided at the outer surface of the conductor tends to be larger. In the covered electric wire according to the present embodiment, the thicker the insulation covering 20 is, the larger the effect of suppressing the thickness of the insulation covering 20 at the corner 23 small by providing the rounded corner shape at the corner 23 of the insulation covering 20 as explained later. Thus, from a viewpoint of acquiring the larger effect due to formation of the rounded corner shape, it is preferable to use the conductor 10 having relatively large cross-sectional area. For instance, the cross-sectional area is preferably 15 mm$^2$ or larger, and more preferably 50 mm$^2$ or larger at a nominal value.

A material constituting the conductor 10 is not specifically limited, and various metal materials can apply to the conductor 10. Representative metal materials constituting the conductor 10 can include copper, copper alloys, aluminum, and aluminum alloys. In particular, since electric conductivity of aluminum and aluminum alloys is lower than that of copper and copper alloys, the cross-sectional area of the conductor made of aluminum and aluminum alloys tends to be large in order to secure necessary electric conduction. Considering as described above, that the effect of providing the rounded corner shape at the corner 23 of the insulation covering 20 is larger when the cross-sectional area of the conductor 10 is larger, the conductor 10 should preferably be made of aluminum or aluminum alloys.

In the covered electric wire 1 according to the present embodiment, the insulation covering 20 covers the outer surface of the conductor 10. In the cross section, corresponding to the fact that the conductor 10 has the flat shape, the entire covered electric wire 1 including the insulation covering 20 also has the flat shape. In addition, cross section of the entire covered electric wire 1 including the insulation covering 20 can be approximated as the rectangular except for the rounded corner shape of the corner 23. Here, the concept that "the cross-sectional shape of covered electric wire 1 is rectangular" indicates a state that the circumscribed figure of the covered electric wire 1 can be approximated as a rectangle within an error range of approximately ±15° in terms of a mutual relationship between the edges. Further, in the cross section, the outer surface of the insulation covering 20 has width-directional regions 21 extending along the edges in the width direction and the height-directional regions 22 extending the edges in the height direction, and the both regions 21, 22 constitute plane regions that can be approximated as a straight line. Further, the thickness t of the insulation covering 20 is uniform in the entire of the width-directional regions 21 and the height-directional regions 22 within an error range of approximately ±15° except the corners 23 and in the vicinity thereof.

In the cross section of the present covered electric wire 1, four corners 23 of the insulation covering 20, or in other words, junctions between the width-directional regions 21 the height-directional regions both configured as plane regions are provided with rounded shapes (a round-chamfered shape; a rounded corner shape; corner roundness). The rounded corner shape can improve the flame retardancy of the insulation covering 20 at the corners 23. Detailed description of the shape of the insulation covering 20 at the corners 23 and the effect due to that shape will be provided later.

The present description mainly deals with the embodiment in which the insulation covering 20 is in close contact with the outer surface of the conductor 10. It is preferable for the insulation covering 20 to be in close contact with the conductor 10 in order to improve the flame retardancy of the insulation covering 20; however, a vacant space may exist between the conductor 10 and the insulation covering 20. Even when such a vacant space exists, the configuration described below can be suitably applied to the insulation covering 20 with regard to the structure thereof such as the shape of the insulation covering 20 at the corner 23 except for the existence of the vacant space. In addition, as described above, the present description mainly deals with the case where the cross-sectional shape of the conductor 10 can be approximated as a rectangle; however, the cross section of the conductor 10 may take a shape other than the shape that can approximate a rectangle. Also in that case, it is preferable to provide the rounded corner shape at the corner 13 of a figure approximating the cross section of the conductor 10 (corresponding to an intersection of two straight lines, an intersection of a straight line and a curved line, or an intersection of two curved lines); and the corner 13 of the conductor 10 and the corner 23 of the corresponding insulation covering 20 should preferably have the structure described below. Examples of the approximate figure of the flat shaped conductor having corners 13 other than a rectangle include ovals (i.e., a shape containing a rectangular shape and arcs joined on both sides; an elliptical shape of the oval; or a running-track shape) and polygons such as hexagons and octagons. When the conductor 10 has an oval shape, the corner 13 is formed as the intersection of a straight line and a curved line, and when the conductor 10 has a polygonal, the corner 13 is formed as the intersection of two straight lines.

The material composing the insulation covering 20 is not specifically limited as long as it is insulating material; however, it is preferable that it is mainly composed of organic polymers. From a viewpoint of increasing the flame retardancy of the insulation covering 20, constituent material of the insulation covering 20 preferably has flame retardancy. However, if the constituent material of the insulation covering 20 has very high flame retardancy, the insulation covering 20 is more likely to achieve sufficient flame retardancy regardless of the shape of the insulation covering 20, such as with or without the rounded corner shape at the corner 23. When the flame retardancy of constituent material of the insulation covering 20 itself is not so high, the effect of flame retardancy by providing the rounded corner shape at the corner 23 of the insulation covering 20 is relatively higher. Specifically, the organic polymer contained in the insulation covering 20 should not consist of a polymer with high flame retardancy such as polyvinyl chloride (PVC), but an organic polymer is preferable which does not have chlorine or high flame retardancy; for example, a polyolefin such as polyethylene is preferable. Flame retardancy should preferably be imparted to the organic polymer by addition of a flame retardant. Moreover, as a flame retardant to be added, it is more preferable to use a flame retardant containing a metal compound such as magnesium hydroxide or other metal hydroxide, rather than a brominated flame retardant or other flame retardant which exhibits high flame retardancy in small amounts.

A material in which a flame retardant containing a metal compound is added to a polyolefin such as polyethylene shows excellence when it is used in non-halogen wire covering material due to its high heat resistance and can be suitably used in the present embodiment. From a viewpoint of increasing the heat resistance, polyolefin should particularly preferably be crosslinked. From a viewpoint of exhibiting sufficient flame retardancy, it is preferable that the amount of the flame retardant is 50 parts by mass or larger with respect to 100 parts by mass of the polyolefin. On the other hand, from a viewpoint of keeping the mechanical property of the insulation covering 20 such as wear resistance, it is preferable that the amount of the flame retardant is 200 parts by mass or smaller with respect to 100 parts by mass of the polyolefin. In addition to the polyolefin and the flame retardant, the insulation covering 20 may contain a polymer other than the polyolefin and may also contain an additive other than the flame retardant.

The method for forming the insulation covering 20 is not particularly limited; however, it is preferable that the layer of the insulation covering 20 at the outer surface of the conductor 10 is formed by extrusion of the composition containing the ingredients mixed together. Depending on the shape of the die for the extrusion, the insulation covering 20 having a predetermined rounded corner shape can be formed at the corners 23 of the cross section.

The covered electric wire 1 according to the present embodiment may be used alone or as a constituent member of the wire harness according to the present embodiment. The wire harness according to the present embodiment include the covered electric wire 1 described in the above embodiment. The wire harness may include a plurality of the above-described covered electric wires 1 and may also include other types of covered electric wires in addition to the above-described covered electric wires 1. Preferably, a plurality of the above-described covered electric wires 1 should be arranged in array (s) in the width and/or height direction. In this case, the specific arrangement structure of the plurality of the covered electric wires 1 is not particularly limited. For example, in a suitable form, the plurality of the covered electric wires 1 are lined up in the width direction and fixed to a common sheet material by fusion or other means. In this case, it is particularly preferable that the heights of the plurality of covered electric wires 1 lined up are uniform.

<Description of the Insulation Covering>

Figure 3:
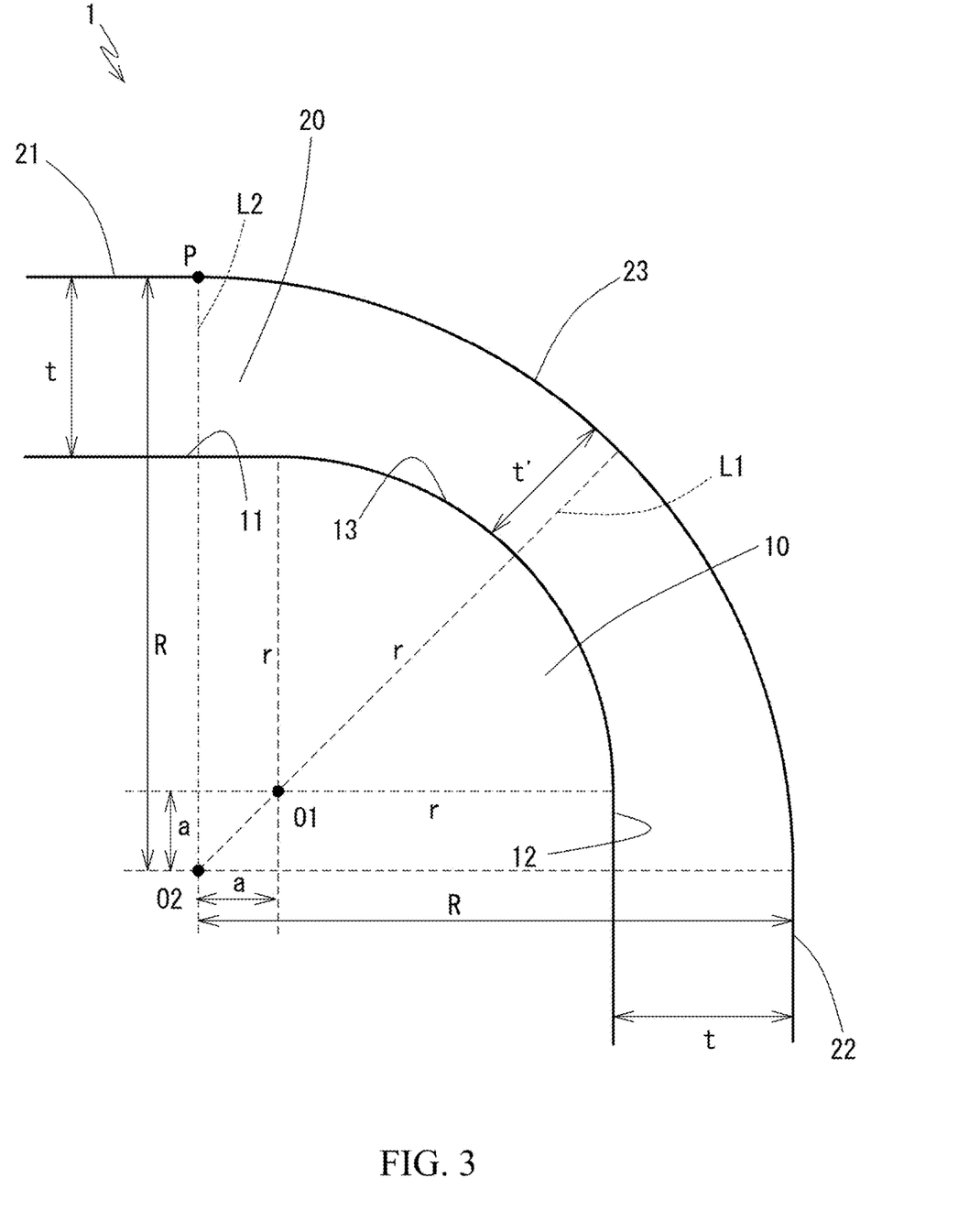
FIG. 3 is an enlarged view of a vicinity of the corner of the covered electric wire according to one embodiment of the present disclosure, showing the case where the radius R of the rounded corner shape of the insulation covering is relatively large. The conductor is indicated by a circumscribing figure.

In the covered electric wire 1 according to the present embodiment described above, the insulation covering 20 which covers the outer surface of the conductor 10 has the rounded corner shapes at the corners 23 as junctions between the width-directional regions 21 and the height-directional regions 22 both configured as the plane regions. Here, as illustrated in FIGS. 2 and 3, the radius of the rounded corner shape at the corner 23 of the insulation covering 20, or in other words, the radius of a circular arc approximating the corner roundness is defined as R. FIG. 2 shows a case where the radius R is relatively small and a center O2 of the rounded corner shape is located outside of the conductor 10 while FIG. 3 shows the case where the radius R is relatively large and the center O2 of the rounded corner shape is located in the conductor 10.

Defining thicknesses of the insulation covering 20 in the plane regions, which is to say, in the width-directional region 21 and the height-direction region 22 as t, the covered electric wire 1 according to the present embodiment satisfies a relationship of R>t between the radius R of the rounded corner shape of the insulation covering 20 and the thicknesses t of the plane regions 21, 22. In other words, the radius R of the rounded corner shape at the corners 23 of the insulation covering 20 is larger than the thicknesses t of the insulation covering 20 in the plane regions 21, 22. As the radius R of the rounded corner shape is larger, the degree of roundness of the rounded corner shape is greater and the corner 23 exhibits a more gentle curve.

In the covered electric wire 1, the thickness direction of the corner 23 corresponds to a diagonal direction of the flat shape of the conductor 10. Thus, if the corners 23 of the insulation covering 20 are formed to have no rounded corner shapes or formed to have the rounded corner shapes with a small radius R, then thicknesses t' of the insulation covering 20 at the corners 23 would be larger, and the volume occupied by the insulation covering 20 would be larger at the corners 23. Further, the distance from the surface of the insulation covering 20 to the surface of the conductor 10 would be greater. As a result, if the insulation covering 20 contacts flame or is burned, a large amount of the insulation covering material would be burned, and the heat generated in the insulation covering 20 would be less likely to be dissipated into the conductor 10. Then, the insulation covering 20 would be more prone to be burned. In addition, if the insulation covering 20 is subjected to burning, the burning would be more likely to continue for an extended period of time.

In contrast, when the corners 23 of the insulation covering 20 are formed to have rounded corner shapes with a sufficiently large radius R, the thicknesses t' of the insulation covering 20 at the corners 23 are small and volumes of the insulation covering 20 at the corners are small. In addition, the distance from the surface of the insulator covering 20 to the surface of the conductor 10 is small at the corner 23. Then, even if flame contacts the insulation covering 20 or the insulation covering 20 burns, the temperature rising of the insulation covering 20 and the progress of combustion are suppressed. This is because volume of the insulation covering which could burn is small, and because the distance along which heat to be dissipated from the insulation covering 20 to the conductor 10 have to be conducted is small, whereby the heat generated in the insulation covering 20 is easily dissipated to the conductor 10. As a result, the insulation covering 20 is less prone to cause combustion. Even if the insulation covering 20 causes combustion, the combustion is stopped in a short time due to self-extinguishing. Thus, when the corners 23 of the insulation covering 20 are formed to have rounded corner shapes with a sufficiently large radius R, the flame retardancy at the corners 23 is increased.

In particular, when the radius R of the rounded corner shape at the corner 23 of the insulation covering 20 satisfies the relationship of R>t with respect to the thicknesses t of the insulation covering 20 in the plane regions 21, 22, the effect of improving flame retardancy by reduction of the thicknesses of the insulation covering 20 at the corners 23 is sufficiently high. For example, when the thicknesses t of the insulation covering in the plane regions 21, 22 are the same as the thicknesses of a conventional covered electric wire having a circular cross section, sufficiently high flame retardancy can be obtained in the entire insulation covering 20, including the corners 23, in comparison with the conventional covered electric wire having the circular cross section. In particular, even if the covered electric wire 1 is installed in a vehicle such as an automobile, and the insulation covering 20 catches fire in the event of fire, the high flame retardancy of the insulation covering 20 helps self-extinguishing at an early stage and suppress spread of the fire through the covered electric wire 1. A relationship of R>1.5t or R>2t is preferred for obtaining higher flame retardancy. A relationship R>r+0.5t is further preferred. In addition, when a relationship of R=r+t is satisfied, the thicknesses t of the insulation covering 20 at the plane regions 21 and 22 and the thickness t' of the insulation covering 20 at the corner 23 are the same.

When the corners 23 of the insulation covering 20 are formed to have rounded corner shapes, it is effective for achieving tight fitting between an external material and the covered electric wire 1, in addition to improving the flame retardancy. For example, when a rubber seal is placed on the outer surface of the insulation covering 20 for the purpose of waterproofing, the rubber seal will fit tightly to the outer surface of the insulation covering 20. Then, high waterproofness can be achieved at the ends of the covered electric wire 1.

From a viewpoint of improving the flame retardancy at the corner of the insulation covering 20, there is no upper limit to the radius R of the rounded corner shape at the corners 23. However, it is preferable to keep the radius R of the rounded corner shape to be reasonably small and to secure sufficient thicknesses t' of the insulation covering 20 at the corners 23, whereby the properties that the insulation covering 20 has, such as insulation and wear resistance, are sufficiently exhibited even at the corners 23. Specifically, the thicknesses t' of the insulation covering 20 at the corners 23 should preferably maintain a relationship of t'>0.8t between the thicknesses t at the plane regions 21 and 22. A relationship of t'≥t is more preferred.

Here, explanation about a relationship between the thicknesses t of the insulation covering 20 at the corners 23 and the radius R of rounded corner shape is provided. As illustrated in FIG. 3, a situation is assumed where the center O2 of the rounded corner shape (having a radius R) at the corner 23 of the insulation covering 20 is located inside the center O1 of the rounded corner shape (having a radius r) at the corner 13 of the conductor 10 by a distance a in the width and height directions, respectively. In this case, assuming a straight line (straight line L1) connecting the center O2 and the center O1 and extending to the surface of the insulation covering 20, the radius R of rounded corner shape of the insulation covering 20 can be expressed by following formula 1.

$$R = t' + r + \sqrt{2}a \quad (1)$$

Meanwhile, assuming a straight line (i.e., straight line L2) connecting the center O2 to the junction point P between the plane regions 21 of the insulation covering 20 and the rounded corner shapes at the corners 23, the radius R of the rounded corner shape of the insulation covering 20 can be expressed by following formula 2.

$$R = t + r + a \quad (2)$$

The right-hand sides of formulas 1 and 2 are equal, so, the distance a can be expressed as follows.

$$a = (t - t')/(\sqrt{2} - 1) \quad (3)$$

Substituting formula 3 into formula 1 or formula 2 and rearranging the obtained formula, the radius R of the rounded corner shape of the insulation covering 20 can be expressed as follows.

$$R = r + (1/(\sqrt{2}-1)) \cdot (\sqrt{2}t - t') \quad (5)$$

$$= r + 2.41(\sqrt{2}t - t') \quad (4)$$

Here, when the relationship of t'>0.8t is established as described above, based on formula 4, the range of the radius R of the rounded corner shape of the insulation covering 20 is expressed as R<r+1.48t. Combining it with the above-explained requirement R>t as described above, which defines the lower limit of radius R, a range of t<R<r+1.48t is obtained as a preferable range of the radius R of the rounded corner shapes at the corners 23.

As described above, since the covered electric wire 1 according to the present embodiment, has the rounded corner shapes at the corners 23 of the insulation covering 20 and the radius R of the rounded corner shape satisfies R>t, reduction of the flame retardancy due to large thicknesses of the insulation covering 20 at the corners 23 can be suppressed even when the insulation covering 20 is formed thickly in the plane regions 21, 22. Rather, when the thicknesses of the insulation covering 20 in the plane regions 21, 22 are larger, the relative effect of improving flame retardancy by forming the rounded corner shape at the corners 23 can be increased. From this viewpoint, it is preferable that the thicknesses t of the insulation covering 20 at the plane regions 21, 22 satisfies a relationship of t>0.10√s with respect to the conductor cross section s. The thickness satisfying this relationship is regarded as relatively large for general insulation coverings provided in standard covered electric wires having circular cross sections, or is still larger. A relationship of t>0.20√s or t>0.30√s is more preferred. In addition, if the thickness of the insulation covering 20 is too large, not only the corners 23 but also the insulation covering 20 as a whole may not have sufficient flame retardancy. Therefore, an approximate relationship of t>0.50√s is preferred.

In the covered electric wire 1, the flatness ratio w/h of the conductor 10 is not particularly limited, since effect of improvement of the flame retardancy can be obtained by providing the rounded corner shape at the corners 23 of the insulation covering 20, regardless of the degree of the flatness ratio of the flat shape of the conductor 10. However, it is preferable that the flatness ratio w/h of the conductor 10 is two or larger. Then, the flat shape of the conductor 10 is more effective in saving space, and is also effective in improving flame retardancy since the length of the outer surface of the conductor is longer and heat is more easily dissipated from the insulation covering 20 to the conductor 10 through the interface. On the other hand, the flatness ratio w/h is preferably six or smaller, and more preferably four or smaller. With this arrangement, a situation is prevented where the flame retardancy of the insulation covering 20 is reduced because of the increase of the volume of the insulation covering 20 that covers the conductor 10 due to a larger flatness ratio and a larger length of the outer surface of the conductor 10.

EXAMPLE

Hereinafter, examples are explained. It should be noted that the present invention is not limited by these examples. In this section, here, the relationship between the radius R of the rounded corner shape of the insulation covering and flame retardancy was investigated.

(Preparation of Samples)

First, conductors composing covered electric wires were prepared. Wire strands comprising a plurality of aluminum alloys elemental wires twisted together and having a circular cross section were prepared and then the obtained wire strands were subjected to compressing with rollers to prepare the conductors having the flat shape. The prepared wire strands had a conductor cross-sectional area (nominal value) of 130 mm$^2$ (diameter of elemental wires: 0.42 mm, and number of elemental wires: 931), or 60 mm$^2$ (diameter of elemental wires: 0.32 mm, and number of elemental wires: 741). The flatness ratios w/h of the conductors were varied between 2.5 to 4 by changing the compression ratio, and plural types of conductors were prepared for each conductor cross-sectional area of the conductor. The radius r of the rounded corner shape of the conductor corner was 4.0 mm when the cross-sectional area of the conductor was 130 mm$^2$, and was 2.6 mm when the cross-sectional area of the conductor is 60 mm$^2$.

Insulation covering were formed on the outer surfaces of the prepared conductors by extruding. In this process, the thickness of the insulation covering and the radius R of the rounded corner shapes of the corners were varied by changing the shape and size of the die used. As constituent material of the insulation covering, material in which magnesium hydroxide was added in an amount of 70 parts by mass with respect to 100 parts by mass of cross-linked polyethylene was used.

The covered electric wires of samples 1-12 were prepared in the above-described manner. Photographs were taken of the cross sections of the prepared samples to confirm that the dimensions of the respective portions in the conductors and insulation coverings were as predetermined. The cross-sectional samples were prepared by cutting the covered electric wires vertically to the axial direction of the covered electric wires embedded in acrylic resin.

(Evaluation of Flame Retardancy)

Flame retardancy was evaluated by performing a combustion test on the above-obtained covered electric wires. Specifically, each covered electric wire was cut to a length of 30 cm, held horizontally, and a reducing flame having a length of 35 mm was brought into contact with the center of the covered electric wire. The insulation covering was observed to catch fire within 30 seconds of flame contact, and after ignition, flame was taken away from the covered electric wire. The time taken for flame to be extinguished spontaneously after flame was taken away (i.e., flame extinguishing time) was then measured. When a covered electric wire exhibited the flame extinguishing time within 30 seconds, the covered electric wire can be evaluated as having sufficient flame retardancy. If the flame extinguishing time is within 30 seconds as evaluated by a similar combustion test for a general covered electric wire having a circular cross section, the covered electric wire is regarded as having sufficiently high flame retardancy to prevent spreading of fire to other parts.

(Results)

Table 1 shows the flame extinguishing time obtained in the combustion test along with the dimensions of respective portions of the covered electric wires. In addition, FIGS. 5A to 5D show photographs of the cross sections of samples 1, and 3 to 5, respectively, before the combustion test was performed.

TABLE 1

| Sample No. | Conductor Cross-sectional area [mm²] | Flatness ratio w/h | Radius r at the rounded corner shape [mm] | Insulation covering Thickness t of plane region [mm] | Radius r at the rounded corner shape [mm] | Ratio R/t | flame extinguishing time [sec.] |
|---|---|---|---|---|---|---|---|
| 1 | 130 | 4 | 4 | 1.6 | 1.6 | 1.0 | 36 |
| 2 | | 2.5 | | 1.6 | 1.6 | 1.0 | 50 |
| 3 | | 3 | | 1.6 | 2.5 | 1.6 | 23 |
| 4 | | 3 | | 1.6 | 3.5 | 2.2 | 12 |
| 5 | | 3 | | 1.6 | 5.5 | 3.4 | 4 |
| 6 | 60 | 3 | 2.6 | 1.5 | 1.5 | 1.0 | 43 |
| 7 | | 3 | | 1.5 | 2.5 | 1.7 | 22 |
| 8 | | 3 | | 1.2 | 1.5 | 1.3 | 17 |
| 9 | | 3 | | 1.2 | 2.5 | 2.1 | 13 |
| 10 | | 2.5 | | 1.5 | 1.5 | 1.0 | 73 |
| 11 | | 3.5 | | 1.5 | 1.5 | 1.0 | 48 |
| 12 | | 4 | | 1.5 | 1.5 | 1.0 | 49 |

First, from at the cross-sectional photographs in FIGS. 5A to 5D, it is confirmed that, in all the photographs, the insulation covering formed on the outer surface of the conductors have plane regions having highly uniform thickness and have corners having the rounded corner shape. The larger the radius R of the rounded corner shape, the more gently curved the corners are.

Table 1 shows that in samples 1, 2, 6, and 10-12 having a relationship of R≤t, or in other words, R/t≤1.0, the flame extinguishing time is over 30 seconds, and thus sufficient flame retardancy is not obtained. In contrast, in samples 3-5, and 7-9 having a relationship of R>t, or in other words, R/t>1.0, flame extinguishing time is within 30 seconds in all cases despite the different conductor configurations and the thickness t of the insulation covering in the plane regions. This indicates that the ratio of radius R of the corner of the insulation covering and thickness t in the plane region is a good indicator about flame retardancy. In addition, when a relationship of R>t is satisfied, the insulation covering obtains excellent flame retardancy.

In each of the group consisting of samples 3-5 and the one consisting of samples 8 and 9, only the radius R of the rounded corner shape is changed among the parameters while the relationship of R>t is satisfied. Comparing the test results of those samples, the larger the radius R, the shorter the flame extinguishing time. From this result, it can be said that the larger the radius R of the rounded corner shape is, in the corner of the insulation covering, the higher flame retardancy becomes.

Although embodiments of the present invention have been described above in detail, the present invention is not limited to the particular embodiment (s) disclosed herein, and various changes and modifications may be made without deviating from the scope of the present invention.

LIST OF REFERENCE NUMERALS

1, 100 Covered electric wire
10 Conductor
11 Length of the conductor in the width direction
12 Length of the conductor in the height direction
13 Corner of the conductor
15 Elemental wire
20, 120 Insulation covering
21, 121 Width-directional regions (Plane region)
22, 122 Height-directional regions (Plane region)
23, 123 Corner (Joint portion)
a Distance between centers O1 and O2 along the width and height directions
L1, L2 Straight line for analysis
h Height of the conductor
O1 Center of the rounded corner shape of the conductor
O2 Center of the rounded corner shape of the insulation covering
P Junction between the rounded corner shape and plane region
r Radius of the rounded corner shape of the conductor
R Radius of the rounded corner shape of the insulation covering
t Thickness of the insulation covering at plane region
t' Thickness of the insulation covering at corner
w Width of the conductor

The invention claimed is:

1. A covered electric wire, comprising:
a conductor; and
an insulation covering which covers an outer surface of the conductor,
wherein,
the covered electric wire has a flat portion where a cross section of the conductor intersecting an axial direction of the covered electric wire has a flat shape which has a larger length in a width direction,
the insulation covering comprises, in the cross section of the flat portion, plane regions which comprises, at the surface thereof:
a width-directional region along the width direction; and
a height-directional region intersecting the width direction,
the insulation covering further comprises a region having a rounded shape having a radius R at the junction between the width-directional region and the height-directional region,
the covered electric wire satisfies a relationship of R>t between the radius R and a thickness t of the insulation covering at the plane region, and
the covered electric wire satisfies a relationship of t>0.10√s between the conductor cross-sectional area s and a thickness t of the insulation covering at the plane region.

2. The covered electric wire according to claim 1, wherein the insulation covering comprises:
a polyolefin; and
a flame retardant comprising a metal compound.

3. The covered electric wire according to claim 2, wherein, the covered electric wire satisfies a relationship of t'>0.8t between a thickness t' of the insulation covering in the region having the rounded shape and a thickness t of the insulation covering at the plane region.

4. The covered electric wire according to claim 3, wherein, the covered electric wire has a flatness ratio of four or smaller, where the flatness ratio is estimated as w/h, defining the length of the conductor along the width direction as w and the length of the conductor along the height direction as h.

5. The covered electric wire according to claim 4, wherein, the conductor comprises a wire strand comprising a plurality of elemental wires twisted together.

6. A wire harness, comprising the covered electric wire according to claim 5.

7. The covered electric wire according to claim 1, wherein, the covered electric wire satisfies a relationship of t'>0.8t between a thickness t' of the insulation covering in the region having the rounded shape and a thickness t of the insulation covering at the plane region.

8. The covered electric wire according to claim 1, wherein, the covered electric wire has a flatness ratio of four or smaller, where the flatness ratio is estimated as w/h, defining the length of the conductor along the width direction as w and the length of the conductor along the height direction as h.

9. The covered electric wire according to claim 1, wherein, the conductor comprises a wire strand comprising a plurality of elemental wires twisted together.

10. A wire harness, comprising the covered electric wire according to claim 1.

11. The covered electric wire according to claim 1, wherein the covered electric wire satisfies a relationship of $0.10\sqrt{s}<t<0.50\sqrt{s}$ between the conductor cross-sectional area s and the thickness t of the insulation covering at the plane region.

12. The covered electric wire according to claim 1, wherein
   a radius r of a rounded corner shape at a corner of the conductor is 33% of a length of a height-directional side of the conductor or larger, and
   the radius R at the junction between the width-directional region and the height-directional region satisfies a relationship of R>r+0.5t with respect to the thickness t of the insulation covering.

13. The covered electric wire according to claim 1, wherein a center of a rounded corner shape at the junction between the width-directional region and the height-directional region is located inside a center of a rounded corner shape at a corner of the conductor in the width and height directions.

* * * * *